Figure 1:
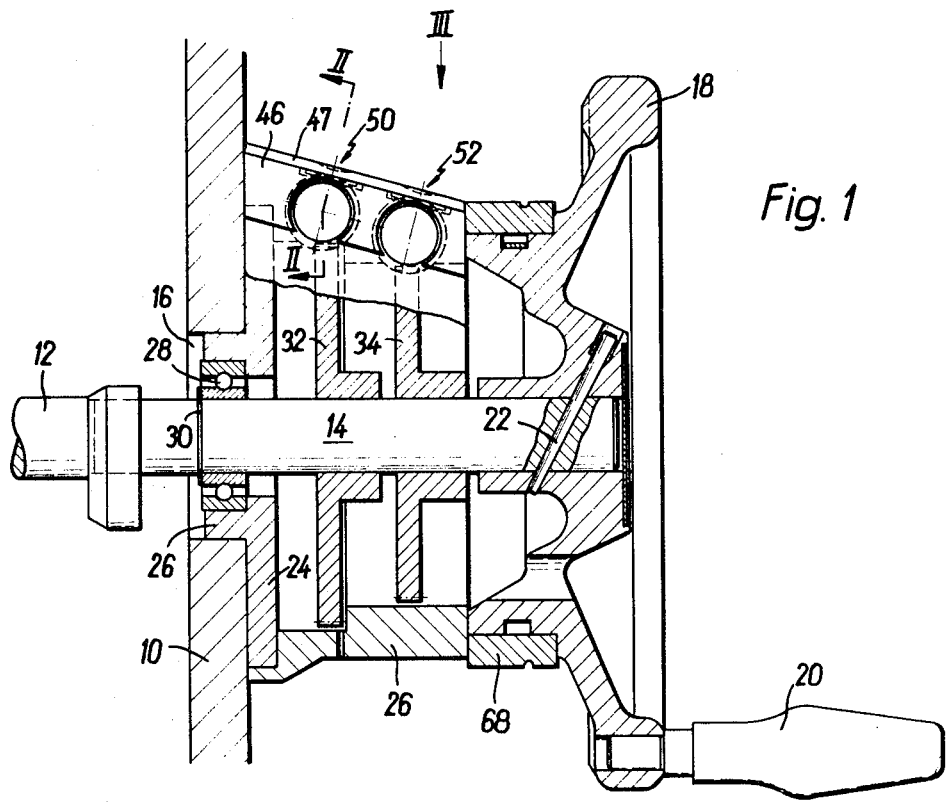

United States Patent

[11] 3,580,216

| [72] | Inventor | Lorenz Weber |
| | | Sussen, Germany |
| [21] | Appl. No. | 761,978 |
| [22] | Filed | Sept. 24, 1968 |
| [45] | Patented | May 25, 1971 |
| [73] | Assignee | Gebruder Boehringer Gesellschaft mit |
| | | Beschrankter Haftung |
| | | Goppingen, Germany |
| [32] | Priority | Sept. 25, 1967 |
| [33] | | Germany |
| [31] | | B94645 |

[54] APPARATUS IN A MACHINE TOOL FOR INDICATING DISPLACEMENT EFFECTED BY A FEED SPINDLE
3 Claims, 3 Drawing Figs.

| [52] | U.S. Cl. | 116/115.5, 82/24 |
| [51] | Int. Cl. | B23g 17/00 |
| [50] | Field of Search | 82/21, 24, 78, 100; 235/132; 116/115.5 |

[56] References Cited
UNITED STATES PATENTS

| 1,854,634 | 4/1932 | Turrettini | 116/115.5UX |
| 2,572,361 | 10/1951 | Luning | 82/24X |
| 2,954,925 | 10/1960 | Bliss et al. | 235/132 |

FOREIGN PATENTS

| 721,536 | 1/1955 | Great Britain | 82/24 |

Primary Examiner—Andrew R. Juhasz
Assistant Examiner—Leon Gilden
Attorney—B. Edward Shlesinger ABSTRACT: The novel apparatus in a machine tool for indicating displacement effected by a feed spindle includes at least one counter counting the number of revolutions of a rotary actuator which is driven by the feed spindle through the intermediary of motion-transmitting means including a slip clutch or the like. The actuator is connected with a manually rotatable element such as a knob and, therefore, may be manually rotated independently of the feed spindle. If desired, two such counters may be provided counting in opposite sense, one in the additive sense and the other one in the subtractive sense.

APPARATUS IN A MACHINE TOOL FOR INDICATING DISPLACEMENT EFFECTED BY A FEED SPINDLE

My invention relates to an apparatus in a machine tool, such as a lathe, for indicating displacement effected by a feed spindle. Such displacement may be the travel of the bed slide effected by the lead spindle.

It is the object of my invention to provide an improved apparatus of the type described in which the indicating means may be manually adjusted for the purpose of correction or for the purpose of setting the indication means to zero in a starting position in which the feed commences.

It is another object of my invention to provide an apparatus of the type set forth in which a plurality of indicators are provided each being manually adjustable independently of the others.

Finally, it is an object of my invention to provide an apparatus of the type set forth which is simple in design and reliable and accurate in operation and can be easily and conveniently read at any time for ascertaining the feed imparted by the feed spindle to an element of the machine tool.

Further objects of my invention will appear from a detailed description of a preferred embodiment of my invention with reference to the accompanying drawings. It is to be understood, however, that my invention is in no way restricted or limited to the details of such embodiment but is capable of numerous modifications within the scope of the appended claims.

In the accompanying drawing

Figure 2:
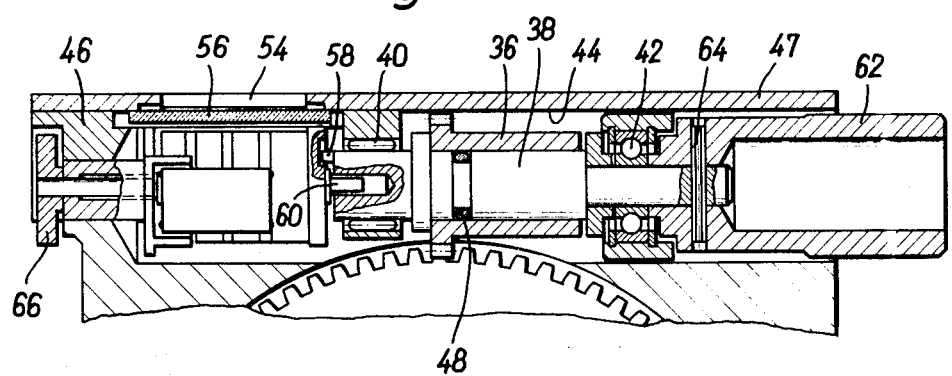
Figure 3:
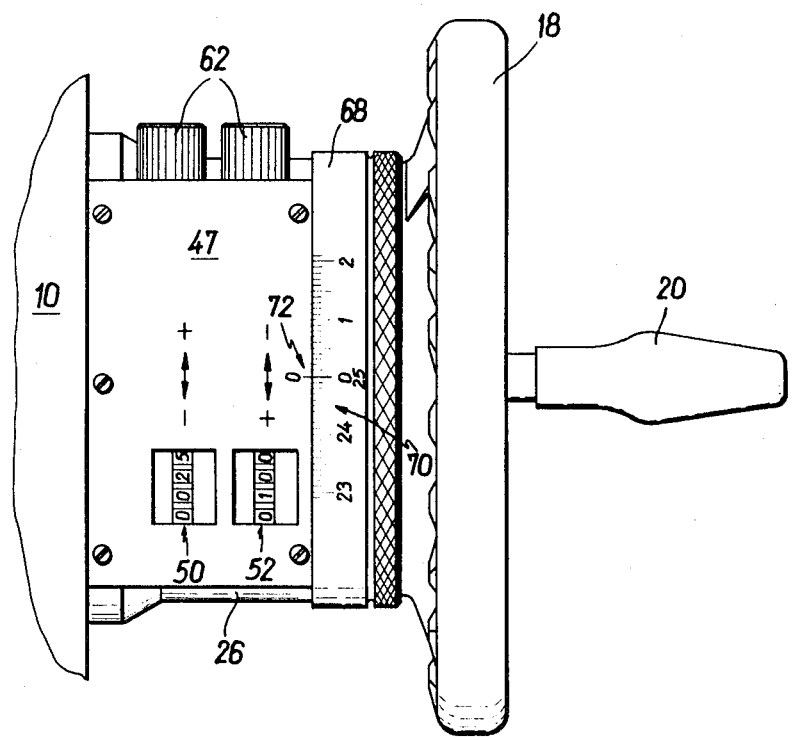

FIG. 1 is an axial section through the novel indicating apparatus for indicating displacement effected by a feed spindle, FIG. 2 is a sectional view the section being taken in the plane 2-2 indicated in FIG. 1, and FIG. 3 is a plan view of the apparatus shown in FIG. 1 viewed in the direction of the arrow III.

A machine tool having a frame 10 is provided with a feed spindle 12 mounted for rotation in bearings (not shown) fixed to the frame 10. This feed spindle serves the purpose of imparting feed motion to an element of the machine tool, such as a slide.

The apparatus described hereinafter serves the purpose of indicating the displacement of the slide effected by rotation of the spindle 12.

An extension 14 of the spindle 12 extends out of the frame 10 through an aperture 16 thereof and on its end carries a handwheel 18 provided with a handle 20 fixed to the extension 14 by a pin 22.

The end wall 24 of a cylindrical housing 26 has a cylindrical flange 25 coaxially disposed with respect to the housing 26 and the spindle 14 and inserted in the aperture 16 of the frame and provided with an internal seat for the outer race of a ball bearing 28 the inner race of which is seated on the extension 14 and on an annular abutment member 30 inserted in a groove thereof.

Each of a pair of helical gears 32, 34 has a hub mounted on the extension 14 and clamped thereto by a clamping screw. Each of the gears 32 and 34 meshes with a set of external helical teeth of a sleeve 36 rotatably mounted on a horizontal shaft 38 extending at right angles to the extension 14 above the same. Each of the pair of parallel shafts 38 is journaled in a roller bearing 40 and a ball bearing 42 mounted within a horizontal bore 44 provided in the top portion 46 of housing 26 having a plane top face carrying a cove plate 47 fixed thereto and being downwardly inclined away from frame 10 as shown in FIG. 1. A slip clutch is provided between the shaft 38 and the sleeve 36. In the embodiment shown this slip clutch is formed by a O-ring 48 inserted in a circumferential groove of shaft 38 and bearing against the bottom of this groove and the internal peripheral surface of sleeve 36. The friction between the O-ring 48, the shaft 38 and the sleeve 36 is of sufficient magnitude to transmit the motion of spindle 12 to the shaft 38 by means of the gear 32 or 34 respectively and the toothed sleeve 36.

Each of the bores 44 accommodates a counter 50 or 52 respectively, comprising coaxial counting wheels of different denominations interconnected by 10-carrying means in the conventional manner. As such counters are well known in the art, a detailed description thereof is deemed dispensable herewith. Each of the counters 50, 52 can be read through a window 54 which is formed by an aperture of plate 47 and is closed by a window pane 56. Each counter 50, 52 is coaxially disposed with respect to the shaft 38. The counting wheel of the lowest denomination is connected with the shaft 38 for common rotation. For this purpose this wheel has a radial groove engaged by an excentric stud 58 on the inner end of shaft 38. The coaxial relationship of the counter and of the shaft is ensured by the provision on the counter of an axial stud shaft 60 extending into an axial bore provided in the end face of shaft 38. The ratio of transmission between the feed spindle 12 and the slide or the like fed thereby and the ratio of transmission between the extension 14 of the feed shaft and the counter are so coordinated to each other that the FIG. indicated on the counter represents the distance of the feed motion in length units, for instance in inch. Preferably, rotation of shaft 38 in one direction will increase the number displayed by counter 50 and will decrease the number indicated by counter 52 the same number of units. Rotation of shaft 38 in the opposite direction will reverse the operation of each of the two counters. Therefore, one counter may be used to indicate the distance of the feed effected in one direction whereas the other counter indicates the distance of the feed effected in the opposite direction.

The outer end section of shaft 38 of reduced diameter which is supported by the ball bearing 42 carries a hollow cylindrical member 62 fixed thereto by a transverse pin 64 and extending out of the bore 44. The projecting end is knurled on its periphery so as to form a knob or handle for manual rotation of the shaft 38. This manual rotation permits each counter to be adjusted independently of the angular position of sleeve 36. During such manual adjustment the shaft 38 will slip within the sleeve 36.

The operator may adjust each of the two counters 50, 52 to any number initially exhibited before the hand wheel 18 will be operated to effect feed motion. The initial number exhibited by each counter may be zero or any other desired number. If desired, one of the counters may be adjusted to a number indicating the feed to be effected. For this purpose such counter is selected for adjustment which is operated in the negative sense by the desired feed motion. As a result, the feed motion will cause the selected counter to be reset to zero. Therefore, the indication by the counter of zero will be indicative of the completion of the desired feed motion. MOreover, it is possible to subsequently adjust the counter indication by a corrective degree that may be necessary, for instance, to compensate wear of the tool or an inaccuracy of the tool position entailed by an exchange of the tool.

When the two counters 50, 52 count in opposite directions, they may be so relatively adjusted as to compensate any lost motion within the train of motion-transmitting elements between each counter and the slide or other element to be fed. With such adjustment one of the counters will be used for the feed in one direction and the other counter for the feed in the opposite direction.

Each counter may be provided with a rotatable knob 66 for the purpose of being reset to zero. As such resetting means for counters are well known in the art, a detailed description thereof is deemed unnecessary.

For the purpose of indicating fractions of the feeding displacement smaller than that causing the counting wheel of the lowest denomination to move from one digit to the following, the hand wheel 18 may be provided with a coaxial cylindrical ring 68 which is graduated on its periphery as indicated at 70 in FIG. 3. This graduation cooperates with a zero mark 72 provided on the plate 47. The ring 68 is frictionally held on the hand wheel and, therefore, may be manually rotated so as to adjust the graduation 70 with respect to the mark 72 to properly indicate the partial feed displacement.

It will appear from the foregoing description that the shaft 38 represents an example of a rotary counter actuator which coordinated to the counter for actuating same and that the gear 32, or 34 respectively, the sleeve 36 geared thereto and the O-ring 48 therein represent an example of frictional motion-transmitting means connecting the spindle 12 with the counter actuator 38, whereas the knob 62 represents a manually operable means connected with the actuator 38 for operating it independently of the spindle 12.

Moreover it will be noted that the gear 32 has a larger diameter than the gear 34. This offers the advantage that the plate 47 may be disposed in inclined position to facilitate the reading of the counters.

The advantages of the invention as here outlined are best realized when all of its features and instrumentalities are combined in one and the same apparatus, but useful results may be produced by apparatus embodying less than the whole.

It will be obvious to those skilled in the art to which the invention appertains that the same may be incorporated in several different constructions. The accompanying drawings, therefore, are submitted merely as showing the preferred examplifications of the invention.

I claim:

1. In a machine tool, the combination comprising a rotatable feed spindle, a counter for indicating the number of rotations of said spindle, a rotary counter actuator coordinated to said counter and mounted coaxially thereof for actuating the same, frictional motion transmitting means connecting said spindle with said counter actuator, manually operable means connected with said counter actuator for operating it independently of said spindle, a second counter, a second counter actuator coordinated to said second counter and mounted coaxially thereof for actuating the same, second frictional motion-transmitting means connecting said second counter with said spindle, second manually operable means connected with said second counter for operating it independently of said shaft and of said first-mentioned counter, and a manually operable zero-setting member connected with each counter for setting the respective counter to zero, each zero setting member being mounted coaxially of the associated counter actuator.

2. In a machine tool the combination comprising a feed spindle, at least two gears fixed thereon, at least two counters, each of said counters being composed of coaxial counting wheels of different denomination, a rotary actuator coordinated to each of said counters and mounted coaxially thereof for operating the same, at least two rotary members, each coaxially coordinated to one of said counter actuators and having a set of teeth meshing with one of the gears, a slip clutch connecting each of said actuators with said rotary member coordinated thereto manually operable zero-setting members, each mounted, respectively, coaxially of one of said actuators and each connected with one of said counters for setting it to zero, and separate handles, each of which is connected with one of said actuators for individually operating the same manually independently of said shaft and is separate from and provided in addition to said counters and to said zero setting members.

3. In a machine tool the combination comprising a feed spindle, a pair of helical gears fixed thereon, a pair of counters each composed of coaxial counting wheels of different denomination, a pair of rotary actuators each coordinated to one of said counters for operating same, a pair of sleeves, each rotatably mounted on one of said rotary actuators and provided with a set of teeth meshing with one of said gears, a pair of O-rings, each mounted on one of said actuators within said sleeve for frictional engagement therewith and constituting a slip clutch, a pair of manually operable zero-setting members, each mounted coaxially of one of said actuators and connected with one of said counters for setting same to zero, and a pair of rotatable handles, each of which is connected with one of said actuators for individually operating the same manually independently of said shaft and is separate from and provided in addition to said counters and to said zero-setting members.